US008638721B2

(12) United States Patent
Brauer et al.

(10) Patent No.: US 8,638,721 B2
(45) Date of Patent: Jan. 28, 2014

(54) METHOD AND ARRANGEMENT IN A TELECOMMUNICATION SYSTEM

(75) Inventors: Peter Brauer, Lödöse (SE); Roland Carlsson, Öjersjö (SE); Olof Liberg, Stockholm (SE); Miguel Lopez, Solna (SE); Henrik Sahlin, Mölnlycke (SE); Mårten Sundberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 13/014,032

(22) Filed: Jan. 26, 2011

(65) Prior Publication Data

US 2011/0207451 A1 Aug. 25, 2011

Related U.S. Application Data

(60) Provisional application No. 61/299,136, filed on Jan. 28, 2010.

(51) Int. Cl.
*H04B 7/212* (2006.01)
(52) U.S. Cl.
USPC ............... 370/328; 370/337; 370/347
(58) Field of Classification Search
USPC .................. 370/328, 330, 337, 347
See application file for complete search history.

(56) References Cited

U.S. PATENT DOCUMENTS

| 7,380,151 B1* | 5/2008 | Bahai ..................... 713/500 |
| 8,170,047 B2* | 5/2012 | Andersen et al. ........ 370/442 |
| 2010/0061698 A1* | 3/2010 | Morello et al. ........... 386/85 |
| 2011/0158338 A1* | 6/2011 | Choi et al. ................ 375/265 |
| 2011/0182372 A1* | 7/2011 | Song et al. ................ 375/259 |

OTHER PUBLICATIONS

U.S. Appl. No. 13/014,090 filed Jan. 26, 2011; Inventor: Lopez et al.
3GPP TS 45.001, "*Physical layer on the radio path*" Technical Specification Group GSM/EDGE Radio Access Network; 3rd Generation Partnership Project, V9.1.0, Nov. 2009.
3GPP TS 45.004, "*Modulation*" Technical Specification Group GSM/EDGE Radio Access Network; 3rd Generation Partnership Project, (Release 1999), Dec. 2009.
B. Muquet, Z. Wang, G.B. Giannakis, M. de Courville, and P. Duhamel, "*Cyclic Prefixing or Zero Padding for Wireless Multicarrier Transmissions*" IEEE Transactions on communications, vol. 50, No. 12, Dec. 2002.
International Search Report and Written Opinion mailed Apr. 18, 2011 in PCT application PCT/SE2011/050083.
Liu et al, "A Novel Iterative Data-Aided Channel Estimation for Time Domain Synchronous-OFDM", Fourth International Workshop on Signal Design and Its Applications in Communications, 2009, IWSDA 2009, IEEE, Piscataway, NJ, Oct. 19, 2009, pp. 48-51.
International Search Report mailed Jun. 10, 2011, in corresponding International Application No. PCT/SE2011/050081.

(Continued)

*Primary Examiner* — Andrew Lee
(74) *Attorney, Agent, or Firm* — Nixon & Vanderhye P.C.

(57) ABSTRACT

Methods and devices for coding a slot in a cellular radio system are described. The coding allows for increased robustness and can be designed to be backwards compatible with transmission for e.g. GSM, GPRS, EGPRS and EGPRS2.

20 Claims, 13 Drawing Sheets

(56) References Cited

OTHER PUBLICATIONS

Written Opinion of the International Searching Authority mailed Jun. 10, 2011, in corresponding International Application No. PCT/SE2011/050081.

Linglong, Dai et al., "A Novel Time Domain Synchronous Orthogonal Frequency Division Multiple Access Scheme", Global Telecommunications Conference, Nov. 30, 2009, pp. 1-6, XP031646418.

Fang Yang et al., "Novel Channel Estimation Method Based on PN Sequence Reconstruction for Chinese DTTB System", IEEE Transactions on Consumer Electronics, IEEE Service Center, vol. 54, No. 4, Nov. 1, 2008, pp. 1583-1589, XP011239717.

DVB Organization: "T2_0198 CfT Response SIDSA_CSS_Estimation.pds", DVB, Digital Video Broadcasting, Jun. 4, 2007, XP017817441.

Telefon AB LM Ericsson: "Precoded EGPRS2 Downlink", 3GPP TSG GERAN45 GP-100364, Feb. 26, 2010, pp. 1-21, XP002638765.

European Communication dated Apr. 25, 2013 in European Application No. 11 703 290.4-1505.

\* cited by examiner

Normal Burst:

Slot format 1a:

| User data 122 samples | Training seq. 26 samples | GP 8.25 |
|---|---|---|

Slot format 1b:

| User data 60 samples | ZP 2 | User data 60 samples | Training seq. 26 samples | GP 8.25 |
|---|---|---|---|---|

Slot format 1c:

| User data | ZP | User data | ZP | User data | Training seq. 26 samples | GP 8.25 |
|---|---|---|---|---|---|---|

Slot format 1d:

| User data | ZP | User data | ZP | User data | ZP | User data | Training seq. 26 samples | GP 8.25 |
|---|---|---|---|---|---|---|---|---|

Figure 4

Slot format 2a:

| Training sequence 26 samples | User data 122 samples | GP 8.25 |
|---|---|---|

Slot format 2b:

| Training sequence 26 samples | User data 60 samples | ZP 2 | User data 60 samples | GP 8.25 |
|---|---|---|---|---|

Slot format 2c:

| Training sequence 26 samples | User data | ZP | User data | ZP | User data | GP 8.25 |
|---|---|---|---|---|---|---|

Slot format 2d:

| Training sequence | User data | ZP | User data | ZP | User data | ZP | User data | GP 8.25 |
|---|---|---|---|---|---|---|---|---|

Figure 5

Slot format 3a:

| TB 3 | User data 119 samples | Training seq. 26 samples | GP 8.25 |
|---|---|---|---|

Slot format 3b:

| TB 3 | User data 116 samples | Training seq. 26 samples | TB 3 | GP 8.25 |
|---|---|---|---|---|

Slot format 3c:

| TB | User data | ZP | User data | Training seq. 26 samples | GP 8.25 |
|---|---|---|---|---|---|

Slot format 3d:

| TB | User data | ZP | User data | Training seq. 26 samples | TB | GP 8.25 |
|---|---|---|---|---|---|---|

Slot format 3e:

| TB | User data | ZP | User data | ZP | User data | Training seq. 26 samples | GP 8.25 |
|---|---|---|---|---|---|---|---|

Slot format 3f:

| TB | User data | ZP | User data | ZP | User data | Training seq. 26 samples | TB | GP 8.25 |
|---|---|---|---|---|---|---|---|---|

Slot format 3g:

| TB | User data | ZP | User data | ZP | User data | ZP | User data | Training seq. 26 samples | GP 8.25 |
|---|---|---|---|---|---|---|---|---|---|

Slot format 3h:

| TB | User data | ZP | User data | ZP | User data | ZP | User data | Training seq. 26 samples | TB | GP 8.25 |
|---|---|---|---|---|---|---|---|---|---|---|

Figure 6

Slot format 4a:

| Training seq. 26 samples | User data 119 samples | TB 3 | GP 8.25 |
|---|---|---|---|

Slot format 4b:

| TB 3 | Training seq. 26 samples | User data 116 samples | TB 3 | GP 8.25 |
|---|---|---|---|---|

Slot format 4c:

| Training seq. 26 samples | User data | ZP | User data | TB | GP 8.25 |
|---|---|---|---|---|---|

Slot format 4d:

| TB | Training seq. 26 samples | User data | ZP | User data | TB | GP 8.25 |
|---|---|---|---|---|---|---|

Slot format 4e:

| Training seq. 26 samples | User data | ZP | User data | ZP | User data | TB | GP 8.25 |
|---|---|---|---|---|---|---|---|

Slot format 4f:

| TB | Training seq. 26 samples | User data | ZP | User data | ZP | User data | TB | GP 8.25 |
|---|---|---|---|---|---|---|---|---|

Slot format 4g:

| Training sequence | User data | ZP | User data | ZP | User | ZP | User data | TB | GP 8.25 |
|---|---|---|---|---|---|---|---|---|---|

Slot format 4h:

| TB | Training sequence | User data | ZP | User data | ZP | User | ZP | User data | TB | GP 8.25 |
|---|---|---|---|---|---|---|---|---|---|---|

Figure 7

Slot format 5a:

| TB 3 | User data 58 samples | Training seq. 26 samples | User data 58 samples | TB 3 | GP 8.25 |
|---|---|---|---|---|---|

Slot format 5b:

| TB 3 | User data | Training seq. 26 samples | User data | GP 8.25 |
|---|---|---|---|---|

Slot format 5c:

| User data | Training seq. 26 samples | User data | TB 3 | GP 8.25 |
|---|---|---|---|---|

Slot format 5d:

| TB 3 | User data | ZP | User data | Training seq. 26 samples | User data | ZP | User data | TB 3 | GP 8.25 |
|---|---|---|---|---|---|---|---|---|---|

Slot format 5e:

| TB 3 | User data | ZP | User data | Training seq. 26 samples | User data | ZP | User data | GP 8.25 |
|---|---|---|---|---|---|---|---|---|

Slot format 5f:

| User data | ZP | User data | Training seq. 26 samples | User data | ZP | User data | TB 3 | GP 8.25 |
|---|---|---|---|---|---|---|---|---|

Figure 8

Slot format 7a:

| TB 3 | User data 58 samples | Training seq. 26 samples | USF | User data 55 samples | TB 3 | GP 8.25 |

↳ 3 samples

Slot format 7b:

| TB 3 | User data | Training seq. 26 samples | USF | User data | GP 8.25 |

Slot format 7c:

| User data | Training seq. 26 samples | USF | User data | TB 3 | GP 8.25 |

Slot format 7d:

| TB 3 | User data | ZP | User data | Training seq. 26 samples | USF | User data | ZP | User data | TB 3 | GP 8.25 |

Slot format 7e:

| TB 3 | User data | ZP | User data | Training seq. 26 samples | USF | User data | ZP | User data | GP 8.25 |

Slot format 7f:

| User data | ZP | User data | Training seq. 26 samples | USF | User data | ZP | User data | TB 3 | GP 8.25 |

Figure 12

METHOD AND ARRANGEMENT IN A TELECOMMUNICATION SYSTEM

CROSS REFERENCE

This application claims the benefit of U.S. Provisional Application No. 61/299,136 filed Jan. 28, 2010, the entire contents of which is hereby incorporated by reference.

TECHNICAL FIELD

The technical field relates to a method and arrangement in a telecommunication system, in particular to a compatible slot format for robust wireless communication.

BACKGROUND

Despite the fact that Global System for Mobile Communication (GSM) networks have been commercially deployed for almost two decades, interest on the continued improvement of the GSM/EDGE (Enhanced Data for GSM Evolution) technology has not dwindled. Network equipment manufacturers, mobile equipment manufacturers and telecom operators continue to be keen on developing further the GSM system. Improvements to the hardware and spectral efficiencies for both voice and packet data services are being actively sought.

The slot format used for normal bursts in GSM, GPRS (General Packet Radio Service), enhanced GPRS (EGPRS) and EGPRS2A is illustrated in FIG. 1, as specified in "3GPP TS 45.001, "Physical layer on the radio path" Technical Specification Group GSM/EDGE Radio Access Network; 3rd Generation Partnership Project". Here, the description is based on samples at rate $F_s=13000/48 \approx 270.83$ kHz, which also is the normal symbol rate within a slot. The slot format is built out of 148 symbols with 3 tail symbols, 58 encoded data symbols, 26 training sequence symbols, 58 encoded data symbols, and finally 3 tail symbols. A guard of 8.25 samples is introduced to separate adjacent time slots. Eight such slots are placed sequentially in time constructing a TDMA frame see "3GPP TS 45.005, "Radio transmission and reception" Technical Specification Group GSM/EDGE Radio Access Network; 3rd Generation Partnership Project". One user can be allocated one or several of these slots within a TDMA frame.

At the transmitter, each slot must fulfill a time mask. An example for 8PSK is illustrated in FIG. 2. Here, the use of tail symbols in the slot format is important since these are predetermined symbols, and do not depend on transmitted data, such that measurements of transmitted power level can be done with high accuracy. These measurements are used to regulate the transmitted power.

A training sequence is a sequence known to the receiver. This is inserted into the slot such that the receiver can estimate distortions of the received signal after it is transmitted. The receiver can then compensate for these distortions such that the reliability of the communication is increased. Examples of distortions which can be estimated by help of the training sequence are Transmitter and receiver filters impulse responses
Radio channel impulse response
Timing offset
Noise variance
Noise correlations between antennas (in receivers with multiple antenna branches)
Carrier frequency offset The training sequence can also be used in order to do blind detection of used modulation.

With the use of wireless packet data communication, the need for higher peak rate and higher spectral efficiency is increasing. Especially, the need for higher bit rates at low to medium signal to interference and noise ratios (SINR) are wanted. This results in the need for slot formats which are robust without sacrificing high peak rate for high SINR.

The slot formats in 3GPP TS 45.001 with the modulation (as specified in "3GPP TS 45.004, "Modulation" Technical Specification Group GSM/EDGE Radio Access Network; 3rd Generation Partnership Project, (Release 1999)"), and transmitter filter (as specified in 3GPP TS 45.004), result in a received signal with inter-symbol-interference (ISI). The physical radio channel further increases the amount of ISI. As a result, the receiver has to rely on advanced algorithms in order to detect transmitted symbols and recover the transmitted bit sequence. The received signal is further distorted by transmitter and receiver imperfections (resulting in e.g. phase noise), carrier frequency offset, timing errors, co-channel and adjacent channel interference etc.

Hence there exist a need for an improved and robust coding being backward compatible with eg GSM, EGPRS and EGPRS2.

SUMMARY

It is an object to provide improved methods and devices to address the problems as outlined above. This object and others are obtained by the method and device as described herein.

A new slot format is introduced. In the slot format a pre-coder to each block of modulated user data is used. Hereby the new slot is backward compatible with GSM, EGPRS and EGPRS2 because it uses the same training sequence which hence is not pre-coded. At the same time a slot format is formed that is more robust and can provide increased data throughput.

Thus, in accordance with one non-limiting, example embodiment a method in a base station of a cellular radio system for coding a slot of data from the base station to a user is provided. The slot comprises at least one user data block and a training sequence. The coded slot comprises at least one pre-coded user data block and the training sequence being modulated in the time domain.

In accordance with one non-limiting, example embodiment the training sequence has the lengths of 26 symbols.

In accordance with one non-limiting, example embodiment the training sequence is the same training sequence as used in EGPRS or EGPRS2.

In accordance with one non-limiting, example embodiment the pre-coding employs a Discrete Fourier Transform.

In accordance with one non-limiting, example embodiment two or more user data blocks are used in the slot.

In accordance with one non-limiting, example embodiment each user data block is pre-coded individually.

In accordance with one non-limiting, example embodiment the slot comprises an uplink state flag.

in accordance with one non-limiting, example embodiment the uplink state flag is transmitted in the time domain.

Another aspect of the technology described in this application is a coder arranged to perform the methods as described herein. The coder can be provided with a controller/controller circuitry for performing the above methods. The controller(s) can be implemented using suitable hardware with or without software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

As a first advantage a slot format according to the present invention is backward compatible with GSM, EGPRS and EGPRS2 in the sense that it has the same:

spectrum mask, time domain mask, training sequence, such that the same channel estimate implementation can be used and the same type of blind detection algorithms As another advantage it enables pre-coding of blocks of modulated user data symbols, e.g. to Orthogonal Frequency Division Multiplexing (OFDM) symbols. This results in a format which is robust against convolution channels.

As yet another advantage it has a placement of training sequence within the slot such that transmitted power can be measured with high accuracy next to a guard.

As further one advantage the slot format can be used with a blind detection between proposed slot format and GSM, GPRS, EGPRS as well as EGPRS2. Signaling of the modulation type in a burst using the proposed slot format may be performed in exactly the same way as in EGPRS/EGPRS2.

As another advantage, the slot format allows EGPRS2 mobiles to decode the USF flag. Thus, the need to segregate mobiles supporting the proposed slot format and mobiles supporting only EGPRS2 is avoided.

As yet another advantage the slot format can be used with a standard "overlap-and-add" receiver.

Other objects, advantages and novel features will become apparent from the following detailed description.

BRIEF DESCRIPTION OF THE DRAWINGS

FIG. 4 shows slot formats with training sequence in the end and a Zero Padding (ZP) between user data blocks.

FIG. 5 shows slot formats with training sequence in the beginning and a Zero Padding (ZP) between user data blocks.

FIG. 6 shows slot formats with training sequence in the end of the slot, Tail Bits (TB) in the beginning and a Zero Padding (ZP) between user data blocks.

FIG. 7 shows slot formats with training sequence in the beginning of the slot and Tail Bits (TB) in the end and a Zero Padding (ZP) between user data blocks.

FIG. 8 shows slot formats with training sequence in the central part of the slot

FIG. 12 shows slot format backward compatible with USF signaling for EGPRS2 mobile stations

DETAILED DESCRIPTION

Figure 2:
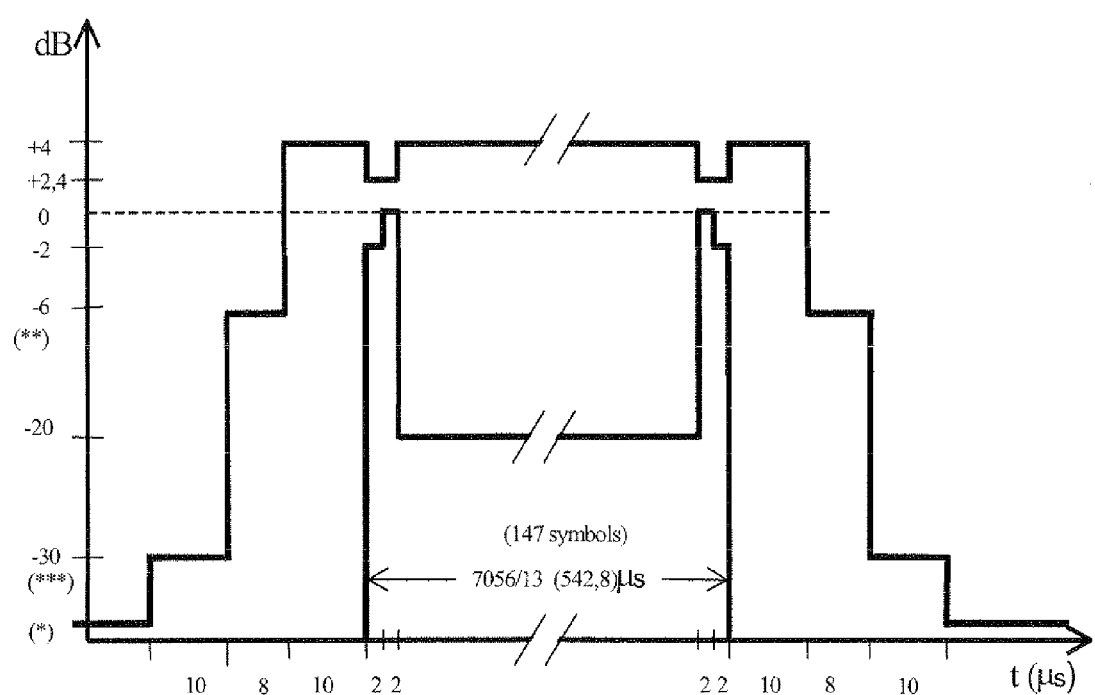
FIG. 2 illustrates time mask for normal duration bursts (NB) at 8-PSK modulation.

A slot format with the training sequence placed in the end of a slot is illustrated in FIG. 4. By placing the training sequence on the slot border towards a Guard Period (GP), the receiver can measure transmitted power with high accuracy since the expected signal level is deterministic over the training sequence, and such that the signals follow the time mask, e.g. as illustrated in FIG. 2. Alternatively, the training sequence can be placed in the beginning of a slot as illustrated in FIG. 5.

In another non-limiting, example embodiment, the training sequence is placed in one end of the slot and a small sequence of Tail Bits (TB) in the other end. These tail bits are forming a short sequence of predefined symbols. See FIG. 6 for examples of slots formats with tail bits in the beginning of the slot and FIG. 7 for tail bits in the end of a slot. Tail bits may also be placed adjacent to the training sequence, resulting in an enlarged training sequence. This will increase robustness at the cost of decreased data rate. This small sequence of tail bits together with a training sequence in the other end of the slot enables measurements of transmitted power in both ends of the slot.

By having the same length the training sequence (i.e. 26 symbols) as used in GSM, EGPRS and EGPRS2A, see Third Generation Partnership Program (3GPP) Technical Specification TS 45.001, similar receiver algorithms and implementations can be re-used, such as channel estimation, noise variance estimation, and timing offset estimation. Other choices of the length of the training sequence are possible.

The technology may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The training sequence is also used for blind detection of modulation in EGPRS and EGPRS2. Here, different rotations are used depending of which modulation that is used for the data symbols. In this manner the receiver can detect which modulation is used on the data symbols in the rest of the slot. In a blind detection algorithm, the receiver typically de-rotates the received signal according to the different rotations used for the various modulations. By means of the known training sequence, the receiver can detect which is the most likely rotation angle.

A blind detection of the proposed slot format is enabled by having the training sequence in another time interval compared to GSM, GPRS, EGPRS and EGPRS2. Compare FIG. 1 with FIG. 4 and FIG. 5. The modulation can be signaled exactly as in EGPRS/EGPRS2, and the blind detection algorithms may also be re-used. Thus, blind detection of modulation for the proposed slot format can be made reliable.

In accordance with one non-limiting, example embodiment the slot format includes a pre-coder to each block of modulated user data symbols. One example of such pre-coder is an IDFT (Inverse Discrete Fourier Transform) such that a block of $N_{DFT}$ user data symbols, $X(k)$ with $0 \leq k \leq N_{DFT}-1$, are transformed to one OFDM symbol as $$x(n) = \sum_{n=0}^{N_{DFT}-1} X(k) e^{j\frac{2\pi n k}{N_{DFT}}}. \qquad (1)$$

for $0 \leq n \leq N_{DFT}-1$. These user data symbols X(k) can be of any modulation such as Binary Phase Shift Keying (BPSK), Quadrature Phase Shift Keying (QPSK), 16QAM (Quadrature Amplitude Modulation), 32QAM, 64QAM etc. Other transforms are also possible, such as wavelets, DCT (Discrete Cosine Transform), Hartley transform, etc.

A slot format with one block of user data is illustrated in "slot format 1a" within FIG. 4. Alternative slot formats with other placements of the training sequence and use of tail bits are illustrated in FIG. 5 to FIG. 7.

If a training sequence with a length of 26 samples is used, the length of the user data block is $N_{DFT}=122$ samples. This leads to a sub-carrier spacing (in the case of using Inverse Discrete Fourier Transform (IDFT) pre-coding) of $\Delta_f = F_s / N_{DFT} \approx 2.2$ kHz. Such a small sub-carrier spacing results in a transmission which is somewhat sensitive to carrier frequency offsets.

An increased sub-carrier spacing can be achieved by using several user data blocks. For example, a slot format with two user data blocks is illustrated as "slot format 1b" within FIG. 4. Here two user data blocks are pre-coded individually, thus forming two OFDM symbols.

For example each block can have a length of $N_{DFT}=60$ samples. This results in a sub-carrier spacing of $\Delta_f = F_s / N_{DFT} \approx 4.5$ kHz, which is significantly more robust to carrier frequency offsets than the use of one user data block. Generalizations to more than two user data blocks are straight forward and examples are illustrated as slot format 1c and 1d in FIG. 4. Also, slot formats with more than one user data block are illustrated in FIG. 5 to FIG. 7 together with different placements of training sequences and use of tail bits.

Figure 10:
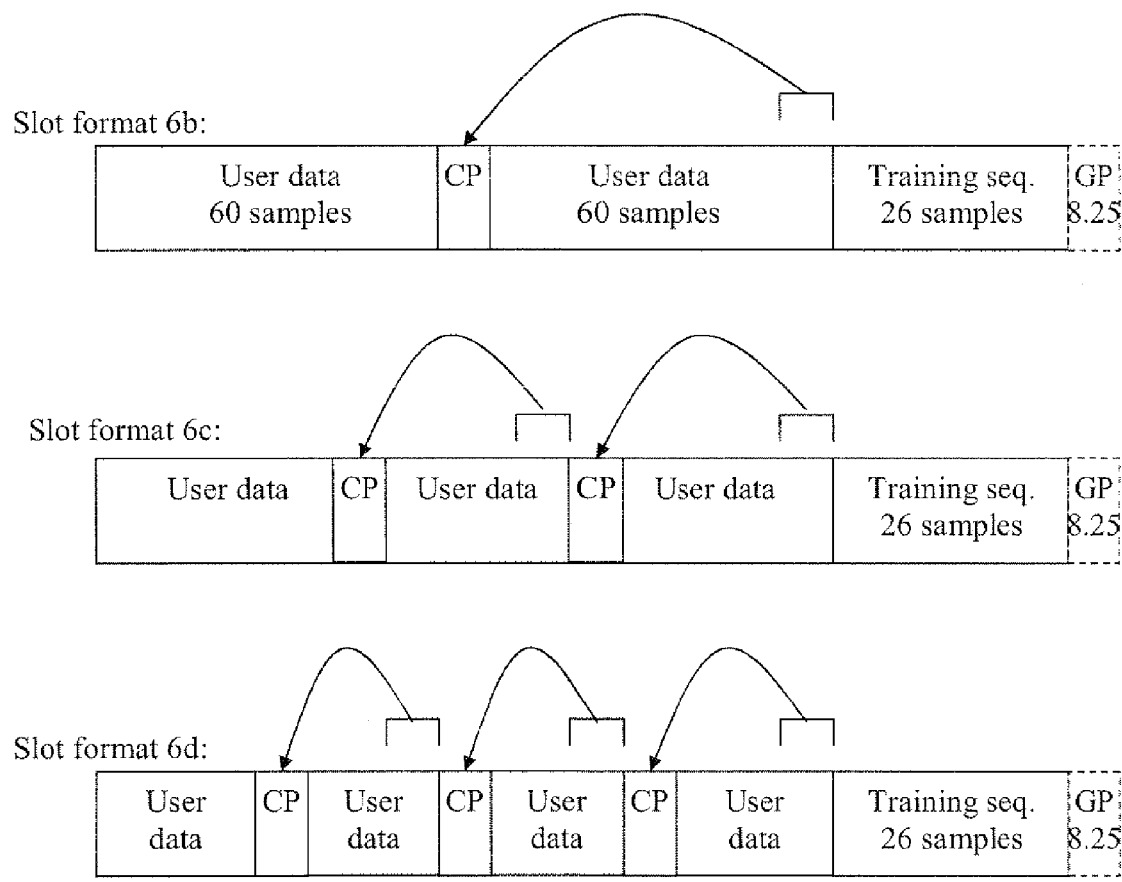
FIG. 10 shows slot formats with training sequence in the end and a Cyclic Prefix (CP) between user data blocks.

In accordance with one non-limiting, example embodiment Zero Padding (ZP) is included between the user data blocks. This is also depicted in FIG. 4 to FIG. 7. This is a short interval where the transmitted samples are equal to zeros. An alternative to using ZP is to use a Cyclic Prefix (CP) between the user data blocks as illustrated in FIG. 10.

Figure 9:
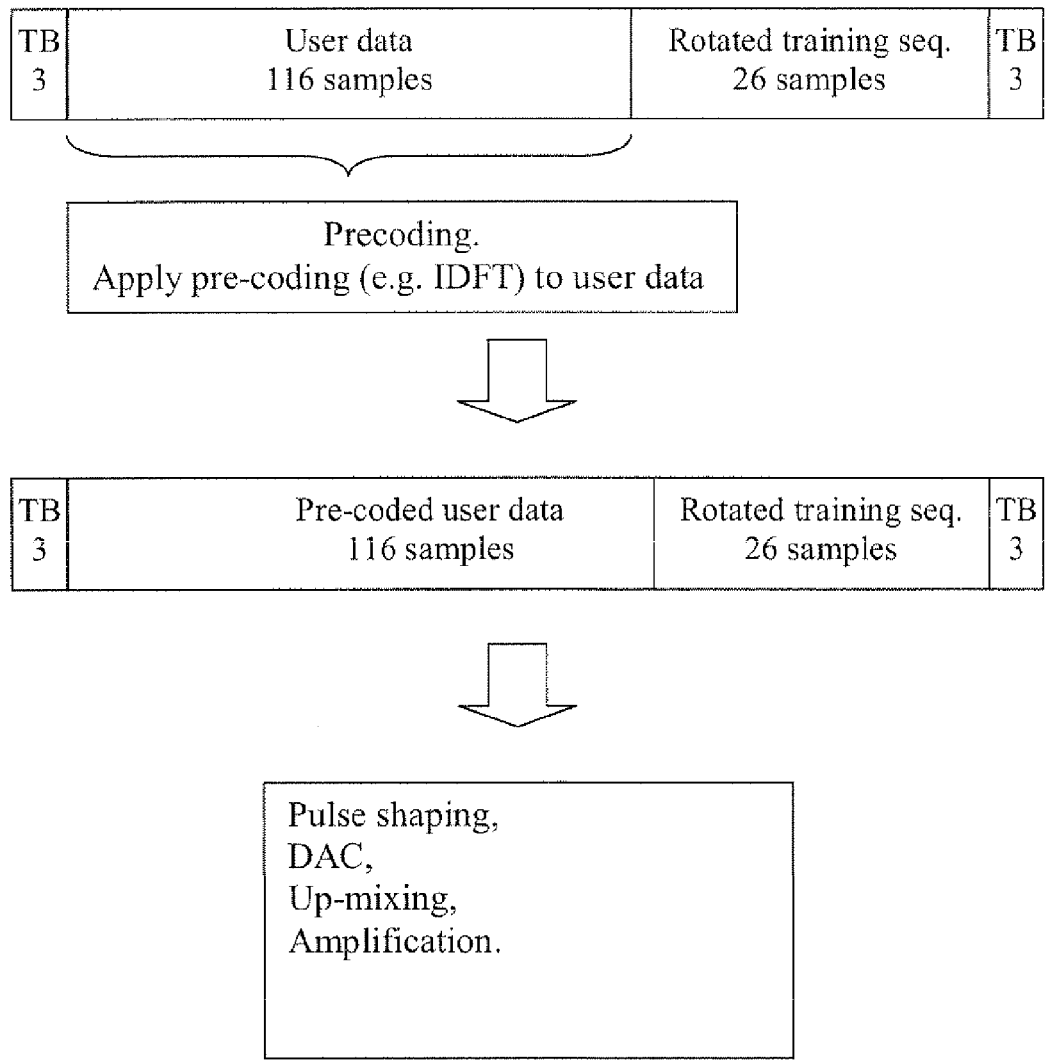
FIG. 9 shows an example of pre-coding and modulation using proposed slot format 3b

An example of user data pre-coding using slot format 3b is shown in FIG. 9.

Figure 3:
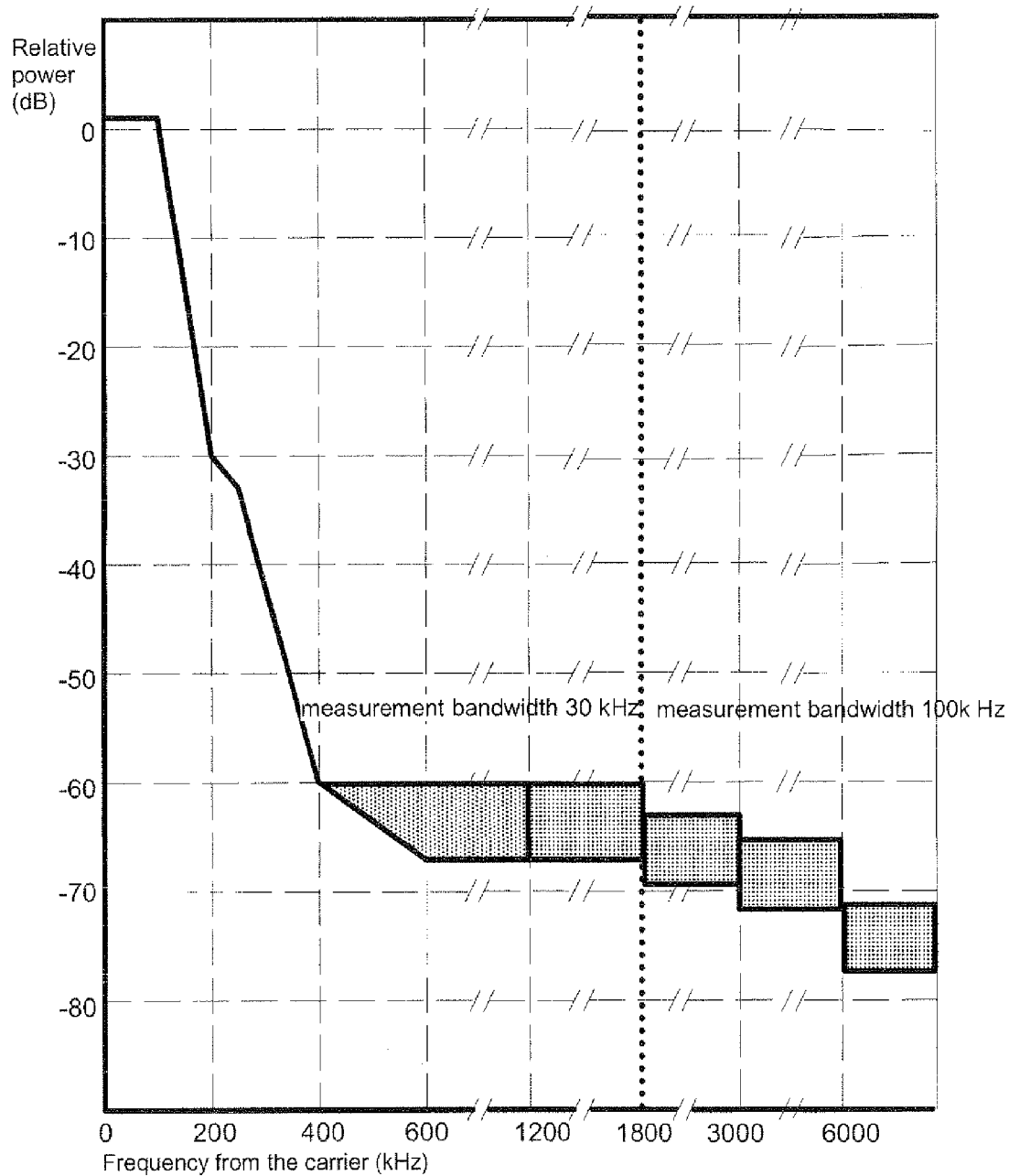
FIG. 3 shows GSM 400, GSM 900, GSM 850 and GSM 700 MS spectrum due to GMSK modulation

As stated above, pre-coding of data can be done by a transform. One disadvantage of using Discrete Fourier Transform (DFT) as transform is the spectral properties which not comply with the properties of the standard specific spectrum mask illustrated in FIG. 3. Therefore the pulse shaping filter will attenuate the symbols located at the border of the spectrum. The outcome will be a larger probability of errors for the symbols transmitted at the border of the spectrum.

One method to overcome this is to design a transform with the same spectral properties as the desired mask, but the use of such a transforms will make the receiver more complex.

One alternative to achieve the same properties can be to design different transforms for each block of data. The desired spectral properties can be reached when measured over the entire transmitted slot. To archive the short time spectral properties, the imaginary (or real parts) data from the transformed block can be swapped between the blocks.

Figure 13:
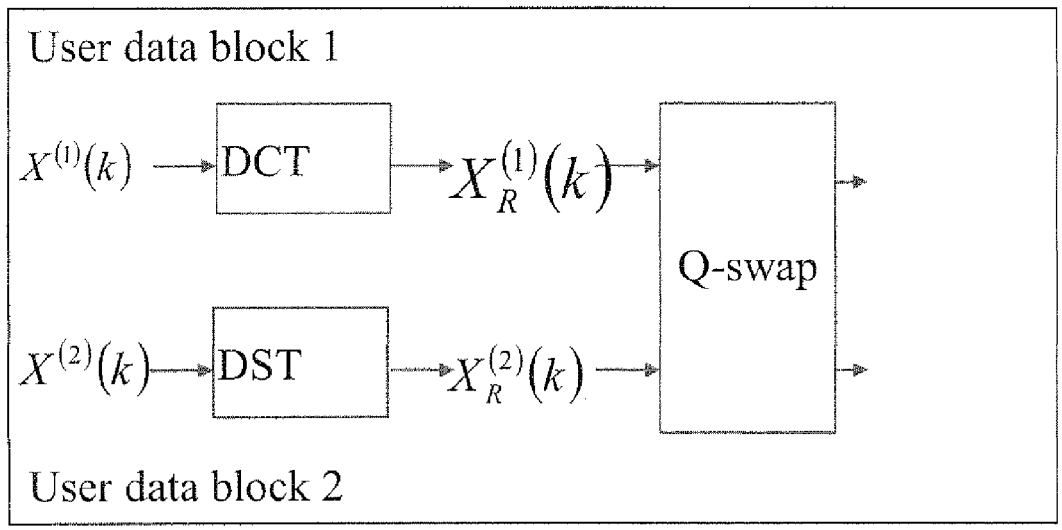
FIG. 13 shows an example of advanced user data pre-coding

As an example, if we have two blocks of data, one block can be transformed using a Discrete Cosine Transform, while the second block can use a Discrete Sine Transform. After swap of the Q-part (i.e. the imaginary part) between the blocks, the influence of the channel filter is decreased when measured over the entire data transmitted. See FIG. 13.

The throughput in terms of bits per second depends on the coding rate used in the channel decoder. A variable coding rate is achieved by using a channel encoder with fixed coding rate (e.g. ⅓) and then use puncturing or repetition to get any other coding rates. The coding rate is selected depending on the quality of the radio link. One way of comparing the different slot formats proposed, is to compare the peak rate, i.e. the use of coding rate equal to unity. However, when comparing the throughput for realistic scenarios, the slots formats must be evaluated at realistic coding rates and radio channels.

Figure 1:
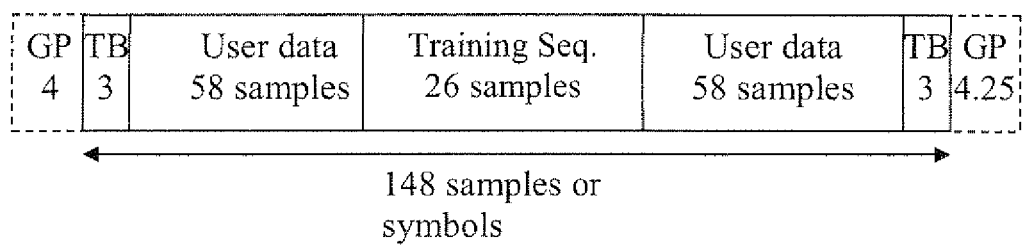
FIG. 1 shows slot format for normal burst with Guard, Tail Bits (TB), user data, and training sequence.

The slot format for normal bursts in FIG. 1 contains $N_s=116$ symbols for user data at slot duration of $T_{slot}=576.9$ µs. With 64QAM modulation and an allocation to all slots in each TDMA frame, this format results in a peak rate of $$R_{NB} = \frac{116 * \log_2(64)}{T_{slot}} \approx 1.2 \text{ Mbps}. \qquad (2)$$

Slot format 1a in FIG. 4 has $N_s=122$ samples for user data. With an IDFT pre-coding and a limitation of using a bandwidth of $F_{BW}=200 \cdot 10^3$ HZ, the number of useable sub-carriers is $$N_{Smyb,1a} = \left\lfloor \frac{F_{BW}}{F_s} N_s \right\rfloor = 90, \qquad (3)$$

where $\lfloor A \rfloor$ is used to denote the nearest lower integer of A, resulting in a (64QAM) peak-rate of $$P_{NB} = \frac{N_{Symb,1a} * \log_2(64)}{T_{slot}} \approx 0.94 \text{ Mbps} \qquad (4)$$

When designing slot formats, as those proposed in FIG. 4 to FIG. 7, the following numbers has to be specified, see Table 1 for examples:
  Number of user data blocks
  Length of user data blocks
  Number of tail bits intervals
  Length of tail bits intervals
  Number of Zero Padding (or Cyclic Prefix) intervals
  Length of Zero Padding (or Cyclic Prefix) intervals The number of ZP (or CP) intervals is always equal to number of user data blocks minus one in FIG. 4 to FIG. 7. Other choices are of course also possible, e.g. equal amount of user data blocks and ZP (or CP).

In all the formats as given in Table 1, the number of samples to be used for TB, ZP and user data blocks equals 122 due to a total slot length of 148 samples and a training sequence of 26 samples. If the length of the training sequence is changed, the values within this table will change accordingly.

When allocating number of samples to different intervals in Table 1, the same length is used for all tail bits intervals. Also, all ZP (or CP) intervals have the same length. In order to use all 122 samples, the length of the user data blocks may vary between the blocks inside one slot. Here, one block is designed to be slightly longer (thus denoted "long data block") than the others (which are denoted "short data block").

Two examples of the length of the ZP (or CP) are given in Table 1. However, other choices are of course also possible.

In case the slot format consist of more than 2 user data blocks, the Q part can be exchanged as $Q_{N\_after\_ex}=Q_N$ where

TABLE 1

Examples of numerology for proposed slot formats as described in FIG. 4 to FIG. 7.

| Slot format name | Tail bits | | Zero Padding or Cyclic prefix | | Number of user data blocks | Long data block | | | Short data blocks | | | Peak rate with 64QAM [Mbps] |
|---|---|---|---|---|---|---|---|---|---|---|---|---|
| | Number of intervals | Length | Number of intervals | Length | | Number of blocks | Length | Number of sub-carriers | Number of blocks | Length | Number of sub-carriers | |
| 1a, 2a | 0 | 0 | 0 | 0 | 1 | 1 | 122 | 90 | 0 | 122 | 90 | 0.936 |
| 1b, 2b | 0 | 0 | 1 | 2 | 2 | 1 | 60 | 44 | 1 | 60 | 44 | 0.915 |
| 1c, 2c | 0 | 0 | 2 | 2 | 3 | 1 | 40 | 29 | 2 | 39 | 28 | 0.874 |
| 1d, 2d | 0 | 0 | 3 | 2 | 4 | 1 | 29 | 21 | 3 | 29 | 21 | 0.874 |
| 3a, 4a | 1 | 3 | 0 | 2 | 1 | 1 | 119 | 88 | 0 | 119 | 88 | 0.915 |
| 3b, 4b | 2 | 3 | 0 | 2 | 1 | 1 | 116 | 85 | 0 | 116 | 85 | 0.884 |
| 3c, 4c | 1 | 3 | 1 | 2 | 2 | 1 | 59 | 43 | 1 | 58 | 42 | 0.874 |
| 3d, 4d | 2 | 3 | 1 | 2 | 2 | 1 | 57 | 42 | 1 | 57 | 42 | 0.874 |
| 3e, 4e | 1 | 3 | 2 | 2 | 3 | 1 | 39 | 28 | 2 | 38 | 28 | 0.874 |
| 3f, 4f | 2 | 3 | 2 | 2 | 3 | 1 | 38 | 28 | 2 | 37 | 27 | 0.842 |
| 3g, 4g | 1 | 3 | 3 | 2 | 4 | 1 | 29 | 21 | 3 | 28 | 20 | 0.832 |
| 3h, 4h | 2 | 3 | 3 | 2 | 4 | 1 | 29 | 21 | 3 | 27 | 20 | 0.832 |
| 5a | 2 | 3 | 0 | 2 | 1 | 1 | 116 | 85 | 0 | 116 | 85 | 0.884 |
| 5b, 5c | 1 | 3 | 1 | 2 | 2 | 1 | 59 | 43 | 1 | 58 | 42 | 0.874 |
| 5d | 2 | 3 | 3 | 2 | 4 | 1 | 29 | 21 | 3 | 27 | 20 | 0.832 |
| 5e, 5f | 1 | 3 | 3 | 2 | 4 | 1 | 29 | 21 | 3 | 28 | 20 | 0.832 |
| Long ZP or CP | | | | | | | | | | | | |
| 1a, 2a | 0 | 0 | 0 | 0 | 1 | 1 | 122 | 90 | 0 | 122 | 90 | 0.936 |
| 1b, 2b | 0 | 0 | 1 | 3 | 2 | 1 | 60 | 44 | 1 | 59 | 43 | 0.894 |
| 1c, 2c | 0 | 0 | 2 | 3 | 3 | 1 | 40 | 29 | 2 | 38 | 28 | 0.874 |
| 1d, 2d | 0 | 0 | 3 | 3 | 4 | 1 | 29 | 21 | 3 | 28 | 20 | 0.832 |
| 3a, 4a | 1 | 3 | 0 | 3 | 1 | 1 | 119 | 88 | 0 | 119 | 88 | 0.915 |
| 3b, 4b | 2 | 3 | 0 | 3 | 1 | 1 | 116 | 85 | 0 | 116 | 85 | 0.884 |
| 3c, 4c | 1 | 3 | 1 | 3 | 2 | 1 | 58 | 42 | 1 | 58 | 42 | 0.874 |
| 3d, 4d | 2 | 3 | 1 | 3 | 2 | 1 | 57 | 42 | 1 | 56 | 41 | 0.853 |
| 3e, 4e | 1 | 3 | 2 | 3 | 3 | 1 | 39 | 28 | 2 | 37 | 27 | 0.842 |
| 3f, 4f | 2 | 3 | 2 | 3 | 3 | 1 | 38 | 28 | 2 | 36 | 26 | 0.811 |
| 3g, 4g | 1 | 3 | 3 | 3 | 4 | 1 | 29 | 21 | 3 | 27 | 20 | 0.832 |
| 3h, 4h | 2 | 3 | 3 | 3 | 4 | 1 | 29 | 21 | 3 | 26 | 19 | 0.790 |
| 5a | 2 | 3 | 0 | 3 | 1 | 1 | 116 | 85 | 0 | 116 | 85 | 0.884 |
| 5b, 5c | 1 | 3 | 1 | 3 | 2 | 1 | 58 | 42 | 1 | 58 | 42 | 0.874 |
| 5d | 2 | 3 | 3 | 3 | 4 | 1 | 29 | 21 | 3 | 26 | 19 | 0.790 |
| 5e, 5f | 1 | 3 | 3 | 3 | 4 | 1 | 29 | 21 | 3 | 27 | 20 | 0.832 |

Figure 11:
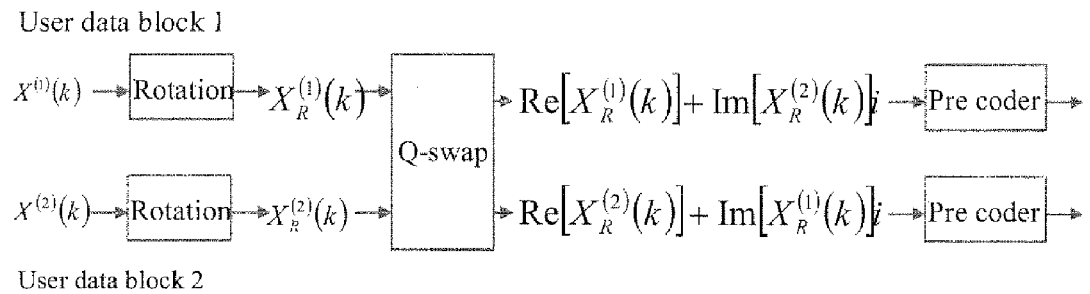
FIG. 11 shows rotation and Q-swap preceding the pre-coder

The pre-coder may also be preceded by a pre-rotation of the complex data symbols followed by Q-swap between the data in the user data blocks (see FIG. 11).

Using the transmission method depicted in FIG. 11 will rotate the data constellation so that the projection of each constellation point on the I axis (and Q axis respectively) is represented by an unique value. A rotation, resulting in $$X_R = \left(\sqrt{\frac{N}{1+N}} + \sqrt{\frac{1}{1+N}}i\right)X$$

where N represent the size in QAM constellation (e.g. 16 QAM), will lead to equidistant representation of all points on the I axis (Q axis).

In a second step the imaginary (Q) part of each symbol in user data block 1 is swapped with the corresponding imaginary part of each user data symbol in user data block 2.

$$N\_after\_ex = \left(N + \left\lfloor \frac{K}{2} \right\rfloor\right) MOD K$$

and K is the number of user data blocks in the slot format.

The new rotated and Q swapped symbols are then fed to the precoder for precoding user data described above.

This handling will result in diversity gain since the two blocks are transmitted at different times.

The idea of rotation and Q swap is in itself well known and is e.g. used in the standardized 'Digital Video Broadcasting—Second Generation Terrestrial' (DVB-T2)

A straightforward extension of the slot format described above consists of placing the training sequence somewhere in the middle of the burst, flanked on both sides by user data. However, if the offset between the location of the training sequence in the proposed slot format and the location of the training sequence in EGPRS/EGPRS2 is not large enough, then another method of blind detection must be devised. See FIG. 8 for a few examples of such formats. Here, each zero padding (ZP) interval can be replaced by a cyclic prefix or a short known sequence.

The Uplink State Flag (USF) for EGRPS2 mobile stations is encoded in symbols immediately to the right of the training sequence. A slot format backward compatible with EGPRS2

USF signaling leaves both the training symbols and the USF symbols as defined for EGPRS2 (in the time domain), while creating two or more data blocks to be pre-coded (in the transform domain, e.g. frequency). This arrangement allows EGPRS2 mobiles to decode the USF flag, even if the new slot format is used. This feature is useful to avoid the need to segregate mobiles compatible with both the proposed slot format and EGPRS2, and mobiles that are only capable of EGPRS2. FIG. 12 illustrates different slot formats that are backward compatible with the modulation and coding schemes DAS-8/12 of EGPRS2. It is straightforward to generate other variants of the slot format which make decoding the USF compatible with EGPRS2 mobiles. For example CP may be introduced in the same way as illustrated in FIG. 10, or by using formats similar to those illustrated in FIGS. 4 to 8 but with the training sequence in the middle.

Figure 14:
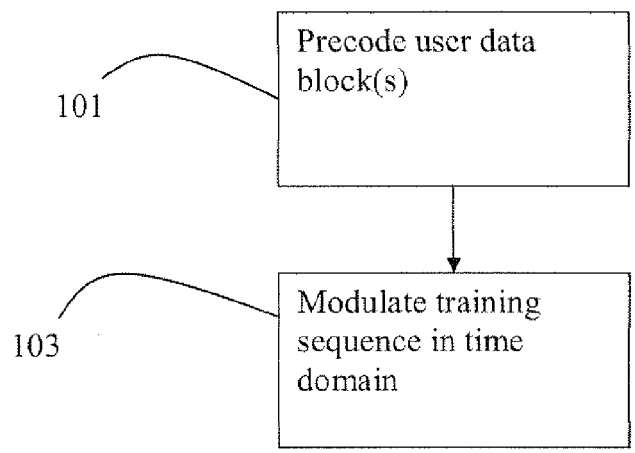
FIG. 14 is a flowchart illustrating some steps performed when forming a slot to be transmitted.

As has been described above user data can be pre-coded while the training sequence can be transmitted in the time domain to support legacy transmission methods used for e.g. EGPRS and EGPRS2. This is illustrated in FIG. 14. In FIG. 14 first, in a step 101, the user data is pre-coded into a transform domain. For example a Discrete Fourier Transform can be applied to a user data block. Then a combined slot with user data in the transform domain and other slot information, in particular the training sequence, in the time domain is formed in a step 103. Next the slot is transmitted in a conventional manner, i.e. modulated and transmitted over the air interface from a radio base station to the intended users.

Figure 15:
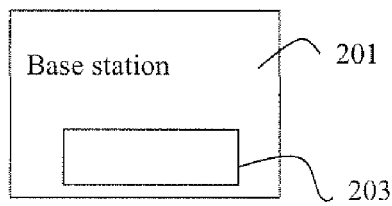
FIG. 15 is a view of a coder to be used for coding data.

FIG. 15 depicts a coder 201 for coding data in accordance with the methods described herein. The coder 201 comprises controller circuitry 203 for performing the various steps required when coding a slot for transmission in accordance with the principles described herein. The controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

The previous description has been directed to the normal symbol rate used in GSM/GPRS/EGPRS/EGPRS2A. The extension of the proposed slot format to the higher symbol rates used in EGPRS2B is straightforward. The only change is in the length of the various slot segments.

The invention claimed is:

1. A method in a base station of a GSM/EDGE cellular radio system for modulating and processing a slot of data to be transmitted from the base station to a user, the slot comprising at least one user data block and a training sequence, the method being comprising the steps of:
 modulating the one user block and the training sequence in the time domain to generate time domain-modulated symbols corresponding to the one user block and time domain-modulated symbols corresponding to the training sequence, and
 further processing the time domain-modulated symbols corresponding the one user data block into a transformed domain to generate transform domain symbols by performing one or more of a Discrete Fourier Transform, a Discrete Cosine Transform, Discrete Sine Transform, Discrete Wavelet Transform, Discrete Hartley Transform or their respective inverse transforms,
 transmitting the slot including the transform domain symbols corresponding to the one user data block and the time domain-modulated symbols corresponding to the training sequence over a radio channel.

2. The method according to claim 1, wherein the training sequence is the same training sequence as used in EGPRS or EGPRS2.

3. The method according to claim 1, wherein the further processing employs a Discrete Fourier Transform.

4. The method according to claim 1, wherein two or more user data blocks are used in the slot.

5. The method according to claim 1, wherein each data block has a prefix including zero-padding or a cyclic prefix.

6. The method according to claim 1, wherein the training sequence is placed either before or after all the data blocks.

7. The method according to claim 1, wherein each user data block is pre-coded individually.

8. The method according to claim 7, wherein different transform domain processors are used for different data blocks.

9. The method according to claim 1, wherein the slot comprises an uplink state flag.

10. The method according to claim 8, wherein the uplink state flag code bits are modulated together with the training sequence in the time domain.

11. Base station apparatus for a GSM/EDGE cellular radio system arranged to modulate and process a slot of data to be transmitted from the base station to a user, the slot comprising at least one user data block and a training sequence, the base station comprising:
 controller circuitry configured to:
  modulate the one user block and the training sequence in the time domain to generate time domain-modulated symbols corresponding to the one user block and time domain-modulated symbols corresponding to the training sequence,
  further processing the time domain-modulated symbols corresponding the one user data block into a transformed domain to generate transform domain symbols by performing one or more of a Discrete Fourier Transform,
 a Discrete Cosine Transform, Discrete Sine Transform, Discrete Wavelet Transform,
 Discrete Hartley Transform or their respective inverse transforms, and
 a transmitter configured to transmit the slot including the precoded user data block transform domain symbols corresponding to the one user data block and the time domain-modulated symbols corresponding to the training sequence over a radio channel.

12. The base station apparatus according to claim 11, wherein the training sequence is the same training sequence as used in EGPRS or EGPRS2.

13. The base station apparatus according to claim 11, wherein the further processing includes performing a Discrete Fourier Transform.

14. The base station apparatus according to claim 11, wherein two or more user data blocks are used in the slot.

15. The base station apparatus according to claim 11, wherein each data block has a prefix including zero-padding or a cyclic prefix.

16. The base station apparatus according to claim 11, wherein the training sequence is placed either before or after all the data blocks.

17. The base station apparatus according to claim 11, wherein each user data block is processed individually.

18. The base station apparatus according to claim 17, wherein the controller circuitry includes different transform domain processors for further processing different data blocks.

19. The base station apparatus according to claim 11, wherein the slot comprises an uplink state flag.

20. The base station apparatus according to claim 19, wherein the uplink state flag code bits are placed adjacent to the training sequence and modulated together with the training sequence in the time domain.

* * * * *

UNITED STATES PATENT AND TRADEMARK OFFICE
CERTIFICATE OF CORRECTION

PATENT NO. : 8,638,721 B2  Page 1 of 1
APPLICATION NO. : 13/014032
DATED : January 28, 2014
INVENTOR(S) : Brauer et al.

It is certified that error appears in the above-identified patent and that said Letters Patent is hereby corrected as shown below:

In the Drawings

In Fig. 7, Sheet 7 of 13, in "slot format 4g:", delete "USE R" and insert -- USER DATA --, therefor.

In Fig. 7, Sheet 7 of 13, in "slot format 4h", delete "USE R" and insert -- USER DATA --, therefor.

In Fig. 15, Sheet 11 of 13, for Tag "201", in Line 1, delete "Base station" and insert -- Coder --, therefor.

In Fig. 15, Sheet 11 of 13, delete "  203" and insert -- 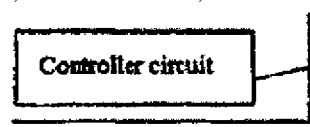 203 --, therefor.

In the Specification

In Column 2, Line 58, delete "in accordance" and insert -- In accordance --, therefor.

In the Claims

In Column 10, Line 24, in Claim 10, delete "claim 8," and insert -- claim 9, --, therefor.

Signed and Sealed this
Twenty-eighth Day of October, 2014

Michelle K. Lee
*Deputy Director of the United States Patent and Trademark Office*